Feb. 12, 1935. W. R. BOYNTON 1,990,773
MIXING AND DISTRIBUTING VALVE
Filed Nov. 1, 1932 2 Sheets-Sheet 1

INVENTOR
WILLIAM R. BOYNTON
BY
ATTORNEY

Feb. 12, 1935.                W. R. BOYNTON                1,990,773
MIXING AND DISTRIBUTING VALVE
Filed Nov. 1, 1932                    2 Sheets-Sheet 2

INVENTOR
WILLIAM R. BOYNTON
BY
ATTORNEY

Patented Feb. 12, 1935

1,990,773

UNITED STATES PATENT OFFICE 1,990,773

MIXING AND DISTRIBUTING VALVE

William R. Boynton, New York, N. Y.

Application November 1, 1932, Serial No. 640,646

4 Claims. (Cl. 277—69)

This invention relates to new and useful improvements in valves.

The invention has for an object the construction of a novel mixing valve and a distributing valve capable of separate use or use in combination. As another object of this invention it is particularly proposed to so construct the valves that they may be used as a concealed bathroom fixture.

As a still further object of this invention it is proposed to equip the valves with handles for their control so that they may control the flow of two liquids separately or mixed to any degree and distributing in a plurality of different directions. The advantage of such construction lies in the fact that the arrangement permits the reducing of building costs as only one such concealed bathroom fixture is required and only one pipe line is required to each point of consumption and such a pipe may readily be concealed to add to the dignity of the construction. The use of two valves in combination as proposed, reduces water rent charges to ⅛ of the formal rentals where a per faucet charge or rental is in effect.

Furthermore, it is proposed to arrange the valves in such a manner so as to eliminate continual washer replacing and repairs and to so construct them that there is nothing that can possibly wear out and get out of order once installed.

Furthermore, the invention particularly tends to arrange the mixing valve so as to control the degree of mixing of two liquids, such as hot and cold water and to arrange the distributing valve in a manner as to be capable of selectively supplying the wash stand, the bathtub, or the shower bath in a bathroom with said liquid or liquids.

Furthermore, as another object of this invention it is proposed to so construct the valve head that portions thereof are removable and particularly the portions which include the channels controlling the operations of the valve allowing replacement and changes to effect variations.

It is a still further object of this invention to construct valves as mentioned which are simple and durable and which may be manufactured and sold at reasonable costs.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
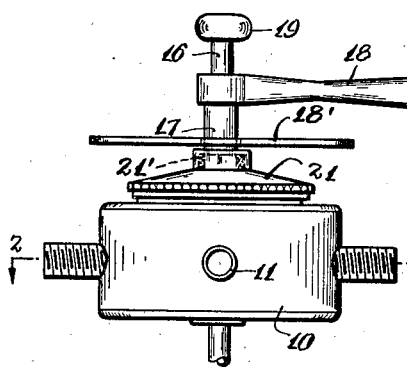
Fig. 1 is a side elevational view of a mixing valve constructed according to this invention.
Figure 2:
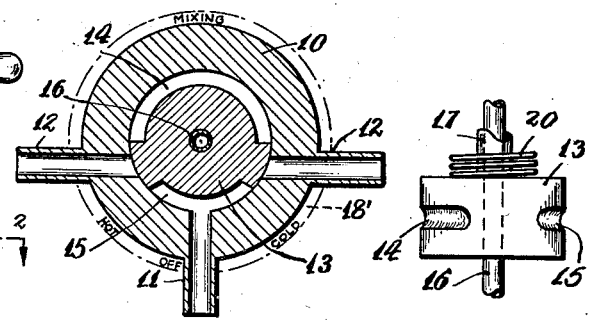
Fig. 2 is a horizontal sectional view taken on the line 2—2 of Fig. 1.
Figure 3:
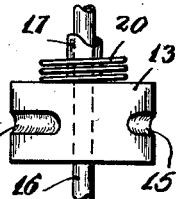
Fig. 3 is a fragmentary side elevational view of the valve head per se and associated parts.
Figure 4:
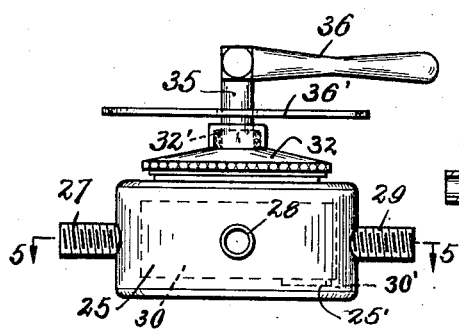
Fig. 4 is a view similar to Fig. 1 but illustrating the distributing valve.
Figures 5, 6:
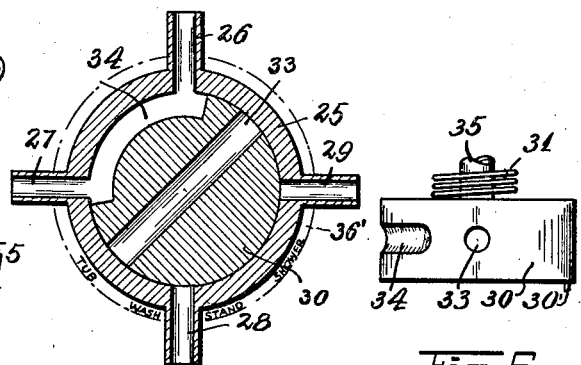
Fig. 5 is a horizontal sectional view taken on the line 5—5 of Fig. 4.
Fig. 6 is a side elevational view of the valve head per se used in Figs. 4 and 5, shown with associated parts.

The mixing valve according to this invention comprises an outer stationary valve casing 10 having a front central outlet 11 and two inlets 12 on opposite sides of the valve body and slightly to the front of a central line and at right angles to the outlet 11. An inner rotatable valve head 13 is rotative within the valve casing 10 and is formed with two peripheral channels 14 and 15 respectively. The channel 14 extends substantially half way around the circumference of the valve head and is of sufficient size so that when moved 180° from the position shown on the drawings to connect both of the inlets 12 with outlet 11. The channel 15 extends substantially one quarter of the circumference and is of sufficient size to provide a full and free passageway from either of the inlets 12 to the outlet 11 when the valve head 13 is slightly moved in one or the other direction.

Arranged in conjunction with the mixing valve there is a waste plug control rod 16. This rod extends through the valve stem 17 which is connected with the valve 13 for its rotation. The handle 18 projects at right angles to the stem 17 and is for convenience in operating the valve. The waste plug control rod 16 is provided at the top with a knob 19. The valve 13 has tapered sides, that is, it is of substantial frusto-conical form so as to insure a tight fit within the stationary valve 10. An expansion spring 20 acts between the top of the valve 13 and a cap 21 mounted upon the valve body 10 for normally urging the valve 13 into a tight connection with its seat.

Packing gland 21' is provided in the valve cap 21 around the stem 17 to prevent leakage. An indicating wall plate dial 18' with suitable inscription, such as "Mixing", "Hot", "Cold" and "Off" is secured to the wall to indicate the position of the control handle 18.

The distributing valve according to this invention comprises an outer stationary valve casing 25 formed with one inlet 26 and three outlets 27, 28 and 29 are arranged at 90° from each other. In conjunction with the stationary valve casing 25 there is an inner rotatable valve 30. This valve also is of frusto-conical shape and urged into its seat by a provision of an expansion spring 31 which acts between the valve and the cap 32 mounted upon the top of the valve member 25. The valve 30 is provided with a diametrical bore 33 and with a peripheral channel 34. The channel 34 is of sufficient size so as to provide a full and free passageway from the inlet 26 to the outlet 27 or when used through 90° clockwise providing a passage from the inlet 26 to the outlet 29. When the valve 30 is moved through 45 degrees anti-clockwise a passage existing from the inlet 26 through the bore 33 to the outlet 28. The valve 30 is provided with a stem 35 extending through the cap 32 and provided with a handle 36 for its operation. Packing gland 32' is provided in the valve cap 32 around stem 35 to prevent leakage. An indicating wall plate dial 36' with suitable inscription, such as "Tub", "Wash Stand" and "Shower" is secured to the wall to indicate the setting of the valve when the control handle 36 is moved. A pin 30' projects from the valve 30 into a short circular groove 25' in the bottom of valve casing member 25 to limit the rotation of valve 30.

Figure 7:
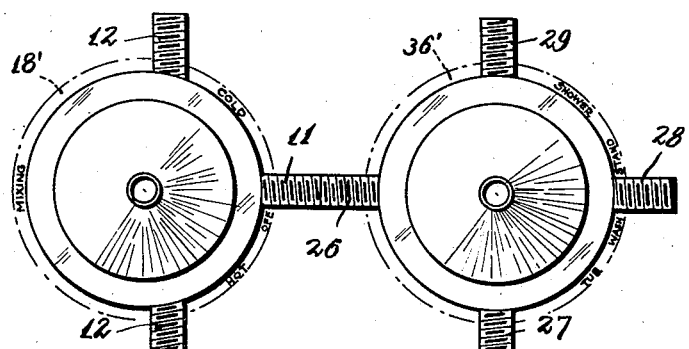
Fig. 7 is a plan view of the mixing and distributing valves shown connected in combination according to this invention.

In Fig. 7, the mixing valve and the distributing valve is shown connected in one particular manner, in series with each other. It will be readily understood that two liquids such as hot and cold water may be connected respectively with two inlets 12 of the mixing valve and selectively or combined to any degree discharged through the outlet 11. In turn the outlet 11 connects with the inlet 26 of the distributing valve so that either the hot or the cold or the mixed water may be selectively discharged through the outlets 27, 28 or 29. These three outlets may be selectively connected with the wash stand, the bathtub, and the shower bath in the bathroom. The combined valves may be used as a visible or concealed bathroom fixture. Of course, it is necessary that handles project to allow operation. There is a great saving in that a single pipe is necessary to each point of consumption. Furthermore, such a single pipe may be readily concealed to add to the dignity of the construction.

Indicating wall plate dials 18' and 36' are provided to indicate the relative positions of mixing and distributing valves.

Figure 8:
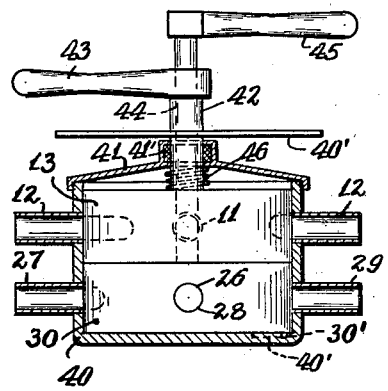
Fig. 8 is a vertical sectional view of a combination valve constructed according to a modification of the invention.

In Fig. 8 another arrangement of the mixing valve and the distributing valve has been shown. More particularly the combined valve is shown disposed within an outer stationary valve casing 40 which houses both the mixing valve 13 and the distributing valve 30. These valves are shown superimposed with the mixing valve at the top. This is not intended as a limitation since they may be arranged with the distributing valve at the top.

The stationary valve casing 40 is provided with a cap 41 and packing 41' through which the stems of the valves project. The valve 30 is provided with a hollow stem 42 equipped with a control handle 43. The distributing valve 43 is provided with a stem 44 extending through the hollow stem 42 and at the top connected with a control handle 45. A spring 46 is arranged coaxially upon the hollow stem 42 and acts between the cap 41 and the top valve to urge the valves downwards upon their seats. Each of the valves are of frusto-conical construction so as to firmly seat within the valve member and upon use to grind themselves into better seating condition. The valve casing 40 is provided with two inlets 12 and a single outlet 11 arranged to coact with the valve 13. Furthermore, the stationary valve casing 40 is also provided with the single inlet 26 and the triple outlets 27, 28 and 29 arranged to coact with the distributing valve 30.

An indicating wall plate dial 40' with suitable inscription, is secured to the wall to indicate the relative setting of control handles 43 and 45. A pin 30' projects from the valve 30 into a short circular groove 40' in the bottom of valve casing member 25 to limit the rotation of valve 30.

Figure 10:
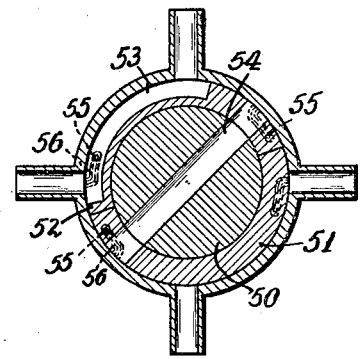
Fig. 10 is a horizontal sectional view as though taken on the line 10—10 of Fig. 9 but also including the valve casing.
Figure 12:
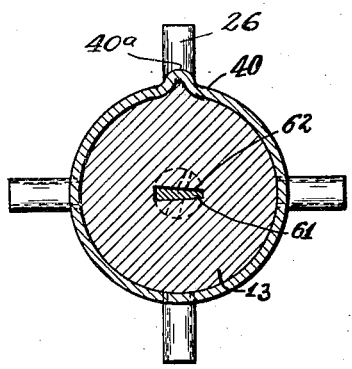
Fig. 12 is a horizontal sectional view taken on the line 12—12 of Fig. 11.
Figure 9:
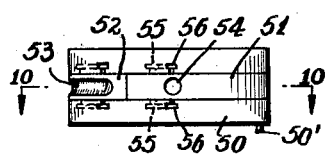
Fig. 9 is a side elevational view of a valve head for use in the valves, but constructed according to a modification of the invention.
Figure 13:
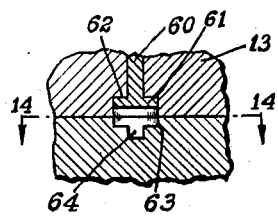
Fig. 13 is a fragmentary vertical sectional view taken on the line 13—13 of Fig. 11.
Figure 14:
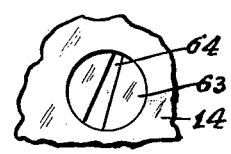
Fig. 14 is a fragmentary elevational view looking in the direction of the line 14—14 of Fig. 13.

In Figs. 9 and 10, a modified form of valve head has been shown for use in either the mixing or the distributing valves previously described. More particularly the valve head 50 is formed with detachable semi-ring sections 51 and 52 arranged along the areas provided with the channels 53 of the valve or with the bore 54. Each of the semi-rings 51 and 52 are provided with headed studs 55 at each of the ends and at the top and bottom sides adapted to engage in bayonet grooves 56 formed in a portion of the valve immediately adjacent the top and bottom sides of the removable ring sections 51 and 52. Thus the semi-rings may be engaged and securely maintained in their positions. The advantage of the particular construction shown resides in the fact that the semi-rings may be removed and replaced with other rings in which the channels or the bores are of different sizes for particular operation of the valves.

Limiting pin 50' projects from the valve head 50 to act as stops at the two extreme positions as the pin reaches abutments, or the ends of a circular groove in the bottom of the valve casing.

In the modified form of the device illustrated in Figs. 11–14 inclusive, a combined valve has been shown which comprises an outer stationary valve casing 40 which houses both the mixing valve 13 and the distributing valve 14. These valves are shown axially positioned with the mixing valve at the top, but the parts could be arranged to have the distributing valve on the top. The stationary valve casing 40 is provided with a cap 41 having packing material 41' at its center through which the stem 60 of the valves extend. The valves 13 and 14 are connected in series to simulate the construction shown in Fig.

7 by connecting the outlet 11 with the inlet 26. A passage for this purpose is shown formed in the valve member 40 and is designated by reference numeral 40ª. The lower end of the stem 60 is provided with a head in the form of a fin 61 adapted to engage in a similar recess 62 formed in the valve 13 upon the bottom side in direct contact with the valve 14. The recess 62 is in communication with a circular recess 63 half in the bottom of the valve 13 and the other half in the top of the valve 14 providing an idler space in which the fin 61 may be freely rotated by rotating the valve stem 60. A fin-shaped recess 64 is formed in the top of the valve 14 communicating with the circular recess 63. A main spring 65 is arranged upon the top of the valve 13 and acts against the cap 41 for normally urging both of the valves downwards tightly against their seats. For this reason the stationary valve casing 40 is formed with tapered sides in which the valves 13 and 14 engage.

The stem 60 is slidably arranged and the top is provided with a handle 66 by which it may be turned and moved longitudinally. A transverse pin 67 extends through the stem 60 beneath the cap 41 and forms an abutment for a small spring 68 which is arranged coaxially upon the stem 60 and acts between the top of the valve 13 and said pin 67. Thus the spring 68 tends to normally urge the stem 60 into the extended position. Provision is made for indicating the location of the lower valve, that is valve 14, and comprises an indicator 69 operating over a scale upon the top of the cap 41 and arranged rotative upon the valve stem 60. This indicator is movable by reason of a transverse peg 70 engaged through the stem 60 and adapted in a certain position of rotation of the stem to engage in a pair of diametrically opposite radial grooves 71 formed in the hub portion of the indicator. The pin 70 is so located that it engages the grooves 71 only when the stem 60 is sufficiently depressed to cause its fin head 61 to engage in the fin recess 64.

Figure 11:
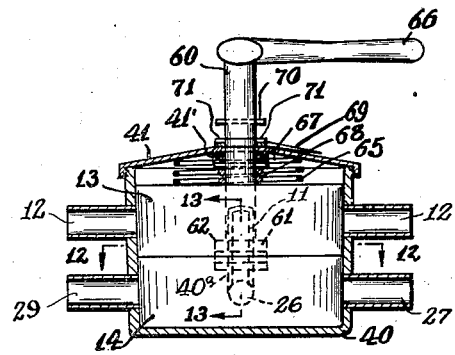
Fig. 11 is a view similar to Fig. 8 but showing a still further modified form of the device.

The operation of the valve shown in Figs. 11-14 inclusive may be understood by first assuming it in the position shown in Fig. 11. If the handle 66 is turned, its rotation will be transmitted to operate the valve 13. To operate the valve 14 it is necessary that the stem 60 be depressed, first to a position in which the fin 61 engages in the circular recess 63. Then the stem 60 must be rotated to a position in which the fin head 61 is immediately over the fin recess 64. In this position the transverse pin 70 will also be directly over the radial recess 71. Then upon further depression of the stem 60 the fin head 61 engages the recess 64 so that the valve 14 may be operated, and simultaneously with the operation of the valve 14 the indicator 69 will be correspondingly moved.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In a valve of the class described, a valve casing having on one transverse plane one outlet and two inlets and on a second transverse plane one inlet and three outlets, a distributing valve within said casing coacting with the inlet and outlets on the second mentioned transverse plane, a mixing valve coaxially superimposed upon said distributing valve and coacting with said outlet and two inlets of the first transverse plane, resilient means acting between the uppermost valve and said valve casing for urging the valves tightly upon their seats, a stem extending through the uppermost valve and out from said valve casing and being provided at its lower end with a fin head engaging in a similar shaped recess in the bottom side of the top valve and upon depression of the stem engageable in a circular recess between the valves and upon further depression of the stem in a certain position of rotation engageable in a receiving recess similarly shaped to the fin head in the top of the lowermost valve, resilient means urging said stem upwards, and an indicator for showing the position of the bottom valve.

2. In a valve of the class described, a valve casing having on one transverse plane one outlet and two inlets and on a second transverse plane one inlet and three outlets, a distributing valve within said casing coacting with the inlet and outlets on the second mentioned transverse plane, a mixing valve coaxially superimposed upon said distributing valve and coacting with said outlet and two inlets of the first transverse plane, resilient means acting between the uppermost valve and said valve casing for urging the valves tightly upon their seats, a stem extending through the uppermost valve and out from said valve casing and being provided at its lower end with a fin head engaging in a similar shaped recess in the bottom side of the top valve and upon depression of the stem engageable in a circular recess between the valves and upon further depression of the stem in a certain position of rotation engageable in a receiving recess similarly shaped to the fin head in the top of the lowermost valve, resilient means urging said stem upwards, and an indicator for showing the position of the bottom valve, comprising a pointer having a hub portion freely rotative upon said stem, and a transverse pin on said stem adapted to engage radial grooves in said hub portion upon depression of the stem to a position in which the fin head engages the receiving recess in the top face of said bottom valve.

3. In a valve of the class described, a valve casing having on one transverse plane one outlet and two inlets and on a second transverse plane one inlet and three outlets, a distributing valve within said casing coacting with the inlet and outlets on the second mentioned transverse plane, a mixing valve coaxially superimposed upon said distributing valve and coacting with said outlet and two inlets of the first transverse plane, resilient means acting between the uppermost valve and said valve casing for urging the valves tightly upon their seats, a stem extending through the uppermost valve and out from said valve casing and being provided at its lower end with a fin head engaging in a similar shaped recess in the bottom side of the top valve and upon depression of the stem engageable in a circular recess between the valves and upon further depression of the stem in a certain position of rotation engageable in a receiving recess similarly shaped to the fin head in the top of the lowermost valve, resilient means urging said stem upwards, and an indicator for showing the position of the bottom valve, said means for urging the stem upwards comprising a transverse pin through said stem, and a spring acting between said pin and the uppermost valve.

4. A valve head, comprising a central section having passages, and semi-ring shaped sections having peripheral channels and engageable around the periphery of the central section and being detachably secured in place, said detachable arrangement comprising headed members projecting from said semi-ring shaped sections and engageable in grooves formed in the central section.

WILLIAM R. BOYNTON.